May 25, 1948.  A. SZERENYI  2,442,185
COMPASS FOR USE IN DRAFTING
Filed May 11, 1944   2 Sheets—Sheet 2
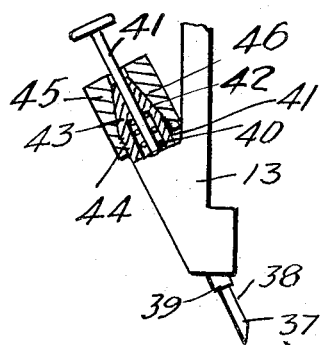
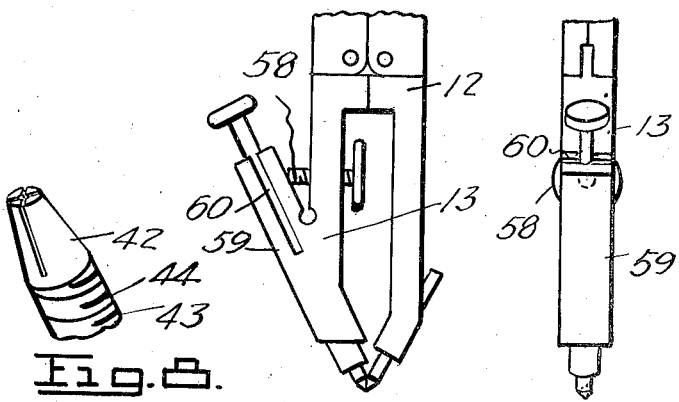
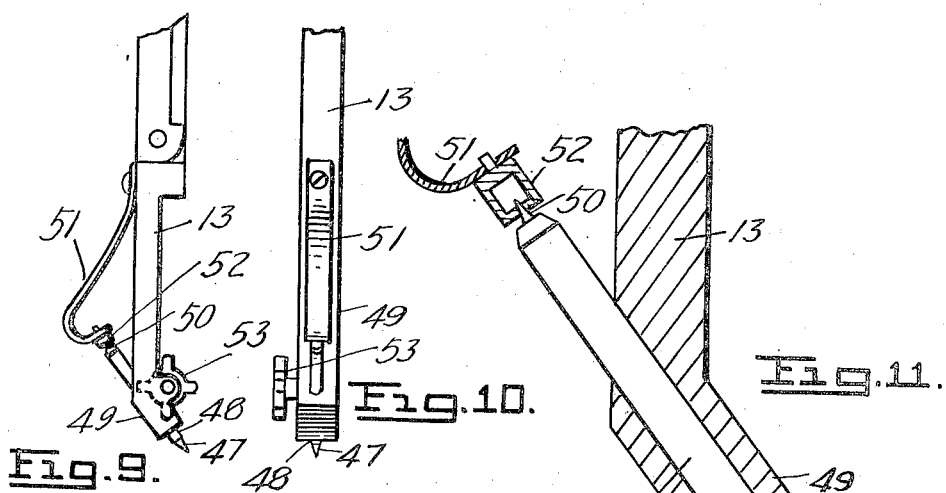
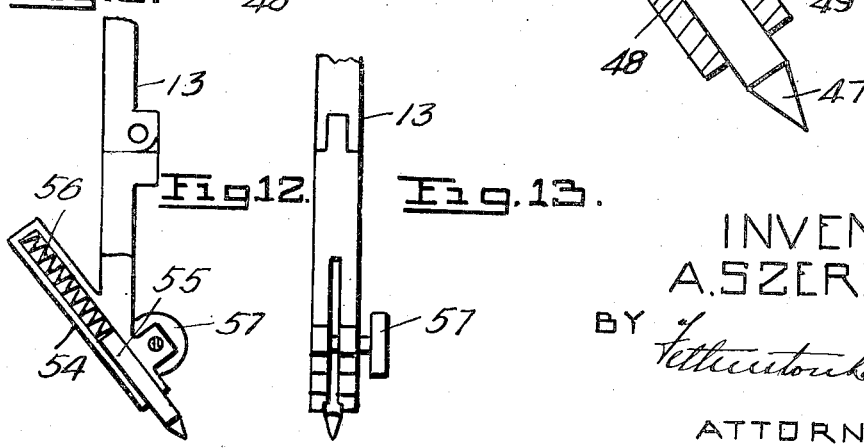
INVENTOR
A. SZERENYI
BY
ATTORNEYS Patented May 25, 1948

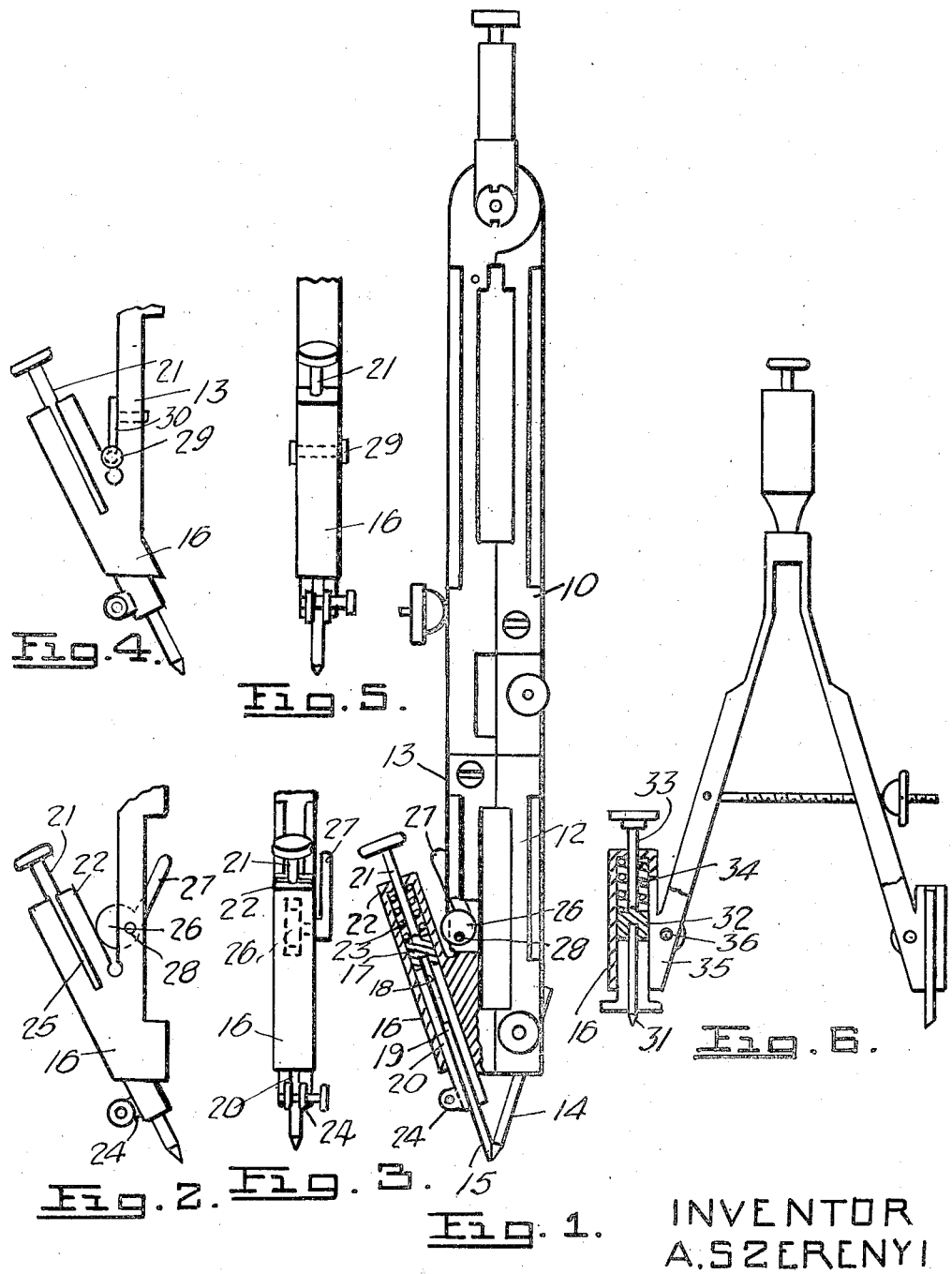

2,442,185

UNITED STATES PATENT OFFICE 2,442,185

COMPASS FOR USE IN DRAFTING

Andrew Szerenyi, Toronto, Ontario, Canada

Application May 11, 1944, Serial No. 535,029

4 Claims. (Cl. 33—27)

This invention relates to improvements in compasses for use in drafting and is a continuation in part of my co-pending application, Serial No. 474,811.

It is an object of the present invention to provide a new type of construction for one of the points of a compass in order to locate it at a level accurately in respect to the drawing point when the compass is used in drawing.

A further object of the invention is to provide an automatic means of locating the compass point including means for locking the point in a set position thereby to facilitate drawing as well as to increase the accuracy of the result, which is particularly important in executing small circles.

With these and other objects in view the invention generally comprises a compass one arm of which is formed with a socket at its lower end designed slidably to receive a pointed shank to form the anchoring point of the compass with means normally urging this point in the direction of the drawing paper upon which it is to be used, thereby to locate it accurately in respect to the paper and the other point of the compass, while providing means for readily locking the shank in the position it is to assume.

The invention will be clearly understood by reference to the following detailed specification taken in conjunction with the accompanying drawings.

In the drawings,

Fig. 1 is a front elevation of a compass with a lower part thereof in section to show the novel construction of the present invention.

Fig. 2 is a fragmentary elevation of the improvement shown in Fig. 1 in section.

Fig. 3 is an end elevation of the improvements shown in Fig. 1.

Figs. 4 and 5 are respectively front and side elevations of the improvement disclosed in Figs. 1 to 3 but showing an alternative locking means.

Fig. 6 is a side elevation of another type of compass showing the improvement of the present invention on one arm thereof and in section.

Fig. 7 is a fragmentary detail partly in section of an alternative form of the locking means.

Fig. 8 is an enlarged fragmentary perspective detail of a part of the lower arm of the compass shown in Fig. 7 to illustrate more clearly the manner of locking.

Figs. 9 and 10 are respectively front and side elevations of a further alternative form of construction.

Fig. 11 is an enlarged detail partly in section of the construction shown in Figs. 9 and 10.

Figs. 12 and 13 are respectively front and side elevations of a further alternative form of construction.

Figs. 14 and 15 are respectively front and side elevations of a still further form of construction.

Referring to the drawings, 10 indicates any suitable compass formed with relatively adjustable arms 12 and 13 each carrying a point of the compass such as a pencil point 14 and a metal anchoring point 15 designed to be projected into the drawing paper and about which the compass is caused to rotate.

According to the present invention the metal point 15 is adjustable. This construction may be formed by providing the lower end of the arm 13 with a sleeve-like socket 16 designed to receive a plunger 17 having a suitable bore 18 housing the shank 19 of the point 15. The plunger 17 is preferably split in half longitudinally over a portion of its length as indicated by the numeral 20. The opposite end of the plunger includes the shaft 21 which projects through the end wall 22 of the socket 16. In between the end wall 22 and the body of the plunger a coil spring 23 is mounted normally to urge the plunger axially in the socket 16. The split parts of the plunger each are provided with an orificed lug 24, the orifices being screw-threaded and, by passing therethrough a suitable screw, they may be drawn together so as firmly to grip the shank 19 of the point 15. This locks the point as a unitary part of the plunger and movable therewith.

The socket 16 may also be longitudinally split over a suitable length, for instance, as shown at 25 (see Fig. 2). Cooperating with this construction is an eccentric clamp member or cam 26 formed with a lever arm 27 and pivoted as at 28 on the arm 13. The clamp or cam member 26 is designed to rest in bearing engagement with the side of the socket member adjacent its upper portion. By moving the lever 27 from the position shown in Fig. 1 to the position shown in Fig. 2, an eccentric clamping action on the sleeve 16 results to cause the split parts of the socket to move towards each other and clamp the plunger.

In use the point 15 is allowed to project to its fullest extent under action of the coil spring 23 on the plunger 17. Therefore, by moving the compass arm against the paper until the point 15 is retracted to the level of the point 14, the point 15 can be accurately located with respect to the point 14 and immediately locked in this position by operating the cam member 27.

Accordingly, therefore, it is not necessary, as in the average compass, to slide the compass point back and forth until it is located at the approximate level of the pen or pencil point 14, which normally is an awkward and time consuming operation. On the contrary, automatic adjustment of the point 15 results when the compass is attached against the paper and the adjustment may be gauged very accurately. Moreover, if it is desired to set point 15 in a given relative position to point 14 before the compass is applied to the paper, this may be done in a simple operation of shaft 21 and a locking or unlocking of the cam 26.

Alternative methods of construction may obviously be employed. For instance, in Figs. 4 and 5 similar construction is illustrated with the exception that the locking means is varied. In this case a transverse headed pin 29 is disposed transversely between the upper end of the socket 16 and the joining end of the arm 13. On the side of the arm adjacent to the pin 29 an eccentrically headed screw pin 30 is positioned so that by rotating this pin and causing the eccentric head thereof to engage the pin 29 in pressure engagement the latter is caused to exert pressure on the socket to force the split parts towards each other in clamping action.

In Fig. 6 an alternative form is illustrated wherein the socket 16 carries the point 31 which is secured in a suitable body 32 forming a plunger body having the shaft 33 connected thereto. The plunger body is spring pressed by the coil spring 34 as in the other forms of construction but the locking effect is obtained merely by splitting the socket or housing, for instance, at 35 and effecting clamping action on the body 32 by means of a screw threaded pin 36.

In Figs. 7 and 8 an alternative clamping means is disclosed in which the point 37 is carried by a shank which fits into the plunger 39 spring pressed within the body by the coil spring 40 similarly to the other constructions. In this case, however, the locking is effected through the shaft 41 rather than the body of the plunger. This is accomplished by tapering the upper end 42 of the housing 43 and splitting the upper end of the housing, (see Fig. 8). At the same time a portion of the upper end of housing 43 is screw threaded as at 44 so that by employing an internally threaded sleeve 45 having a tapered or conical interior as at 46, the latter sliding upon the tapered end 42 of the housing causes the split parts thereof to come together to clamp the shaft 41.

In the alternative construction shown in Figs. 9 and 10, the point 47 is formed on a shank 48 which passes slidably through the socket 49. The opposite end of the shank 48 may carry an alternative point 50 as is usual and, by providing a suitable bow spring 51, pivoted at one end to the arm 13 of the compass and carrying a socket member 52 on its opposite end which will fit over the point 50 or the point 47. In this case, therefore, the shank may be reversed and either working point is urged towards the paper by the spring 51. The housing 49 is formed preferably as a split housing and by employing a clamping screw member 53, the shank may be located and secured in the adjusted position required.

In the form shown in Figures 12 and 13 the socket 54 is designed slidably to receive the shank 55 and carries a coil spring 56 extending between the end of the shank and the end of the socket, thus normally urging the shank and its working point outwardly. By splitting the socket or arm carrying it, and providing a clamping screw 57, the shank may be locked in its adjusted position.

In the form shown in Figures 14 and 15 the clamping means consist of an adjusting screw 58 passing through the arm 13 of the compass into engagement with one side of the upper end of the socket 59 which is split as at 60 and designed to clamp the plunger controlling the working point of the compass.

As illustrated in the foregoing, by the provision of simple means, such as a slidable plunger, adjustable manually or automatically by cooperation of a spring, and including clamping means for locking purposes I provide a means of quickly and accurately adjusting the working point of the compass relatively to the pen or pencil carried by the opposite arm. Obviously, this will lend to greater accuracy of drawing and will facilitate the handling of the instrument.

What I claim as my invention is:

1. A compass comprising a pair of arms pivoted together at their upper ends and having points at their lower ends, one of which may be a pen or pencil, a housing on the lower end of one of said arms, a sleeve slidably mounted in said housing and carrying one of said points therein, a spring mounted in said housing, said sleeve being axially slidable under influence of said spring, a pin extending upwardly through the housing from said sleeve, an operating handle carried by said pin for raising said point, and locking means for locking said sleeve and the carried point at predetermined positions.

2. A compass comprising a pair of arms pivoted together at their upper ends and having points at their lower ends, one of which may be a pen or pencil, one arm carrying a housing at its lower end for slidably receiving one of said compass points, resilient means in connection with said housing for urging said compass point downwardly, said housing being split, and cam means engageable with said housing for compressing said split portions towards each other operatively to clamp said resiliently urged point in selected adjusted position.

3. A compass as claimed in claim 2 in which the cam means comprises a pivoted lever having an eccentric cam surface engageable with said housing.

4. A compass comprising a pair of arms pivotally connected together at one end and having points at their lower ends, one of which constitutes an anchoring point, a housing on the lower end of the arm carrying the anchoring point and designed slidably to receive the anchoring point, resilient means normally urging the said anchoring point downwardly, said housing being split at its upper end to form separated portions and clamping means movable into pressure engagement with the upper end of the housing for forcing said separated portions towards each other to operatively clamp said anchoring point in selected adjusted position.

ANDREW SZERENYI.

REFERENCES CITED

The following references are of record in the file of this patent:

UNITED STATES PATENTS

| Number | Name | Date |
| --- | --- | --- |
| 180,150 | Morgan | July 25, 1876 |
| 285,017 | Crowell | Sept. 16, 1883 |
| 1,779,725 | Bell | Oct. 28, 1930 |